United States Patent
Miftakhov et al.

(10) Patent No.: US 11,411,236 B2
(45) Date of Patent: Aug. 9, 2022

(54) ON-BOARD OXYGEN BOOSTER FOR PEAK POWER IN FUEL CELL SYSTEMS

(71) Applicant: ZeroAvia, Inc., Hollister, CA (US)

(72) Inventors: Valery Miftakhov, San Carlos, CA (US); Henry Grishashvili, San Jose, CA (US)

(73) Assignee: ZeroAvia, Inc., Hollister, CA (US)

( * ) Notice: Subject to any disclaimer, the term of this patent is extended or adjusted under 35 U.S.C. 154(b) by 0 days.

(21) Appl. No.: 16/798,284

(22) Filed: Feb. 21, 2020

(65) Prior Publication Data
US 2020/0395626 A1  Dec. 17, 2020

(51) Int. Cl.
| | |
|---|---|
| H01M 8/04 | (2016.01) |
| H01M 8/04746 | (2016.01) |
| H01M 8/04858 | (2016.01) |
| H01M 8/04111 | (2016.01) |
| H01M 8/04082 | (2016.01) |

(52) U.S. Cl.
CPC .... *H01M 8/04753* (2013.01); *H01M 8/04111* (2013.01); *H01M 8/04201* (2013.01); *H01M 8/04925* (2013.01)

(58) Field of Classification Search
CPC ......... H01M 8/04111; H01M 8/04201; H01M 8/804753; B64D 2041/005
USPC ...................................................... 429/444
See application file for complete search history.

(56) References Cited

U.S. PATENT DOCUMENTS

| | | | |
|---|---|---|---|
| 3,801,372 A | 4/1974 | Shaw | |
| 5,106,035 A | 4/1992 | Langford | |
| 5,810,284 A | 9/1998 | Hibbs et al. | |
| 6,119,979 A | 9/2000 | Lee et al. | |
| 6,322,915 B1 | 11/2001 | Collins et al. | |
| 6,568,633 B2 | 5/2003 | Dunn | |
| 9,227,626 B2 * | 1/2016 | Pandit | B60W 20/40 |
| 2001/0018138 A1 | 8/2001 | Iwase | |
| 2002/0005454 A1 | 1/2002 | MacCready et al. | |
| 2006/0246177 A1 * | 11/2006 | Miki | H01M 8/04089 426/24 |
| 2016/0118679 A1 * | 4/2016 | Joos | H01M 8/04089 429/415 |

FOREIGN PATENT DOCUMENTS

DE          19821952 A1     11/1999

OTHER PUBLICATIONS

Sharon Thomas and Marcia Zalbowitz, "Fuel Cells—Green Power".

* cited by examiner

*Primary Examiner* — James M Erwin

(57) ABSTRACT

Recognizing the fact of extremely low utilization of peak power (especially in the aviation use case), we propose a novel approach to significantly reduce the size and weight of the system by downsizing the main air compressor to match the air flow required to produce the desired continuous power (e.g., 55% of the peak power rating for the aviation applications, etc.), and provide the supplemental oxygen flow from an on-board high-pressure oxygen tank.

14 Claims, 1 Drawing Sheet

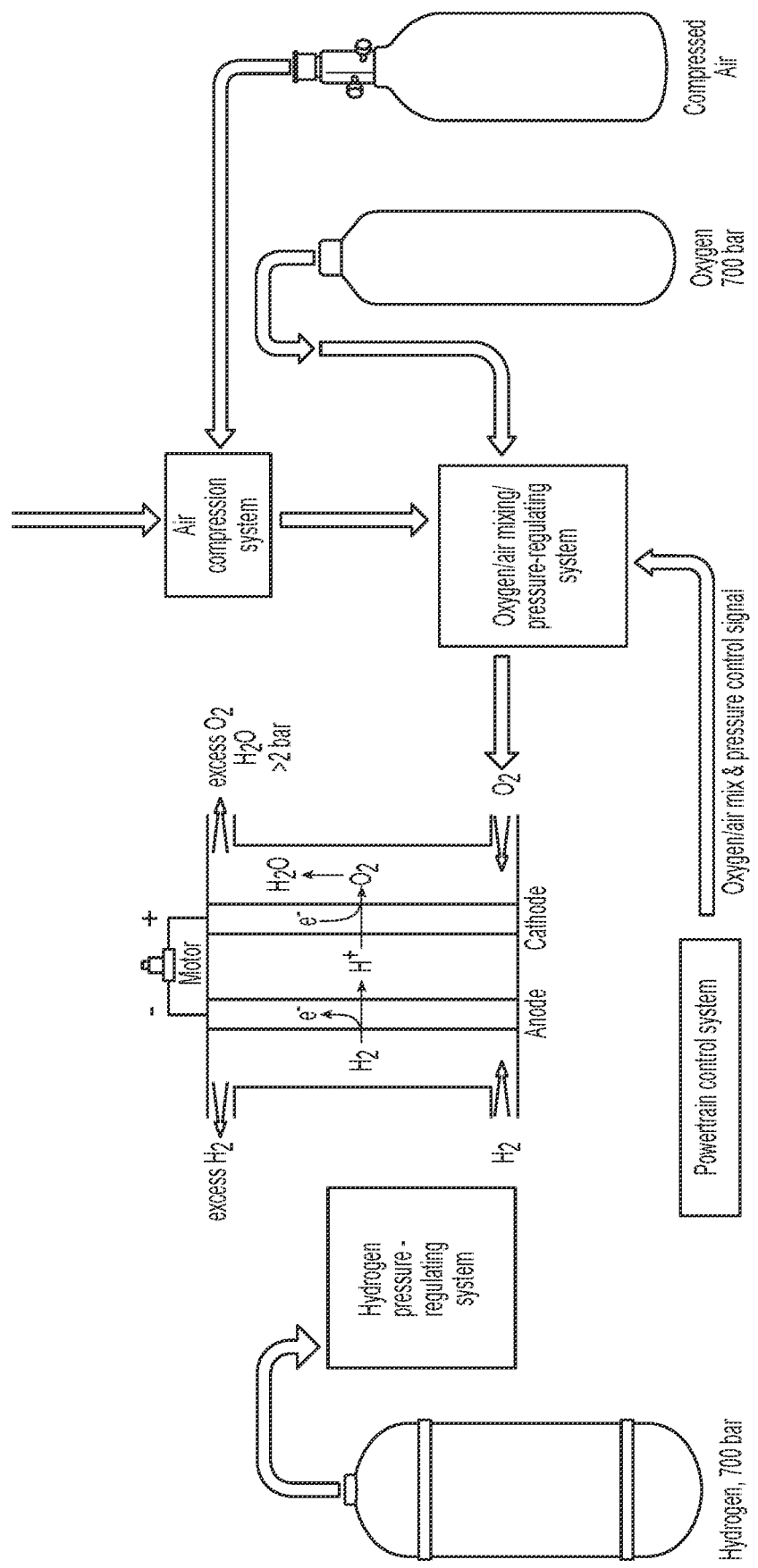

ON-BOARD OXYGEN BOOSTER FOR PEAK POWER IN FUEL CELL SYSTEMS

CROSS-REFERENCE TO RELATED PATENT APPLICATION

This regular U.S. patent application relies upon and claims the benefit of priority from U.S. provisional patent application No. 62/808,309, entitled "ON-BOARD OXYGEN BOOSTER FOR PEAK POWER IN FUEL CELL SYSTEMS," filed on Feb. 21, 2019, which is incorporated by reference herein in its entirety.

BACKGROUND OF THE INVENTION

Field of the Invention

The disclosed embodiments relate in general to clean energy-based air transportation systems technology, and, more specifically, to an on-board oxygen booster for peak power in fuel cell systems.

Description of the Related Art

In today's high performance fuel cell systems, oxygen supply is one of the most serious performance bottlenecks. At peak power output, a very significant amount of air needs to be supplied to the fuel cell—for example, in one 125 kW fuel cell system, over 500 kg of air needs to be supplied per hour at high pressure. The current state of the art in the industry is to use electric motor-driven compressors to provide such flows to achieve peak power. These compressors are extremely expensive and heavy, resulting in significant degradation of the overall system performance per unit of weight.

SUMMARY OF THE INVENTION

The inventive methodology is directed to methods and systems that substantially obviate one or more of the above and other problems associated with conventional technology.

In accordance with one aspect of the present disclosure described herein, there is provided a method for providing an on-board oxygen booster for peak power in a fuel cell system, the method comprising downsizing the main air compressor to match the air flow required to produce the desired continuous power (e.g., 55% of the peak power rating for the aviation applications, etc.), and providing the supplemental oxygen flow from an on-board high-pressure oxygen tank.

Additional aspects related to the invention will be set forth in part in the description which follows, and, in part, will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 1 depicts one embodiment of an on board oxygen power booster in accordance with the present disclosure.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

We observe that in most of the fuel cell applications the peak power needs to be produced rather infrequently. For example, in aviation applications, peak power needs to be produced only for 2 minutes per flight—during the initial takeoff roll and 1,000 foot climb, before the power levels are reduced to 85% or lower. Similarly, in automotive applications, maximum power is requested from the system only during the times of heavy acceleration and such periods generally last less than 10 seconds, and applied perhaps every few minutes of driving. Therefore, maximum power is requested from the system only for 1-2% of the time (aviation) or 3-5% of the time (automotive).

FIG. 1 illustrates one embodiment of the present disclosure including a fuel system 10 having an on-board oxygen power booster 20 in accordance with the present disclosure. More particularly, the on-board oxygen power booster 20 includes an oxygen tank 30 operatively coupled to an air compressor system 40 which cooperates with an oxygen-air mixing/pressure regulating system 50. The on-board oxygen power booster 20 is controlled by the powertrain control system 60 to regulate on-demand usage of the on-board oxygen power booster 20. A supplemental tank 44 of compressed air may be utilized in lieu of a high voltage battery setup to initiate the fuel cell 100 start-up process as explained in more detail below.

Oxygen Tank

Recognizing this fact of extremely low utilization of peak power (especially in the aviation use case), we propose a novel approach to significantly reduce the size and weight of the system by downsizing the main air compressor 40 to match the air flow required to produce the desired continuous power (e.g., 55% of the peak power rating for the aviation applications, etc.), and provide the supplemental oxygen flow from an on-board high-pressure oxygen tank 30.

Oxygen from the supplemental tank 30 is then mixed in on demand with compressed air from the main compressor 40 (that is now substantially smaller and lighter), based on the signal from the main powertrain control unit (PCU) 60. The from the PCU 60 specifies the target O2 partial pressure to the mixing/pressure-regulating device 50 to arrive at the right oxygen flow to support the target power level.

An additional component of such new system could also be an oxygen recirculation system 70 that would capture exhaust air from the fuel cell output (which still has some remaining oxygen) and direct it back to the ambient air input 42 of the system 20. Such a recirculation system 70 would be especially useful if very high oxygen concentrations are requested by the PCU 60 and the concentration of oxygen in the fuel cell exhaust is correspondingly higher.

The supplemental oxygen supply 30 proposed in this invention could be stored in the standard on-board composite cylinder tanks with similar molar density as the H2 storage already present in the system. In aviation application example, a system 20 operating at 125 kW peak power for 2 minutes and 70 kW continuous power for 90 minutes, would require only 2 kg of usable supplemental O2. Today's readily available technology allows the ability to store such an amount of oxygen in an oxygen tank 30 with an empty weight of about 4 kg. Therefore, the complete oxygen booster system 20, including the proposed air-oxygen mixing system 50, would weigh less than 8 kg. For comparison purposes, a commonly used battery power/energy buffers would weigh at least 50 kg and require complicated electronics (battery management system). As can be seen, this novel proposed approach would result in a six-fold reduction of weight compared to current state-of-the-art systems Compressed Air Tank In addition to auxiliary oxygen tank 30 a compressed air tank 44 can be used to substitute the air compressor system 40 function at initial fuel cell system 100 startup process. In order to start the fuel cell system 100, electric power is required to start the main air compressor 40. This initial power requirement varies, possibly up to 20 kW. This requires the presence of a high voltage battery pack (not shown) for starting the fuel cells 120. In order to avoid using high voltage battery pack (due to weight and system complexity) an auxiliary compressed air tank 44 can be used. At the initial fuel cell system 100 start-up stage, auxiliary compressed air tank 44 replaces the compressor 40 function and supplies compressed air at given pressure and flow rate until the fuel cell 120 voltage rises to a level high enough to drive the main air compressor 40. This will allow the start of the fuel cell system 100 without a high voltage battery pack at the ground as well as in the air in case of emergency shut down/restart procedure. Existing high-pressure air tanks made of composite materials will significantly reduce the weight of the system compared to high voltage batteries.

In order to maintain pressure in the air tank 44, a relatively small and lightweight compressor (not shown) can be used because charging rate for such a system does not have to be high (compressed air is only used during system start up).

FIG. 1 depicts one possible system 10 according to the present disclosure including: oxygen booster system 20 (having oxygen tank 30, main air compression system 40, oxygen air mixing/pressure regulating system 50, and auxiliary compressed air tank 44), a fuel cell system 100 (having fuel cell 120), a hydrogen supply 200 and hydrogen pressure regulating system 210, a motor 300 and a powertrain control system 60.

Finally, it should be understood that processes and techniques described herein are not inherently related to any particular apparatus and may be implemented by any suitable combination of components. Further, various types of general-purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in aircraft power plants. It is intended that the specification and examples be considered as exemplary only, with a true scope and spirit of the invention being indicated by the following claims.

What is claimed is:

1. A method of boosting power in an aircraft fuel cell system on demand, the method comprising:
   operably coupling a compressed air source to a hydrogen fuel cell to initiate hydrogen fuel cell startup, the compressed air source supplying compressed air at a continuous flow rate until a voltage of the hydrogen fuel cell is high enough to power an air compression system;
   introducing an auxiliary on-board oxygen supply into the air compression system utilizing an oxygen-air mixing and pressure regulating system, the oxygen-air mixing and pressure regulating system configured to supply oxygen to the hydrogen fuel cell, the hydrogen fuel cell operably coupled to a hydrogen source, the air compression system, and a motor;
   and
   coupling the oxygen-air mixing and pressure regulating system with a powertrain control system to provide additional oxygen from the on-board oxygen supply to boost power to the motor on demand from the powertrain control system during aircraft takeoff and initial climb.

2. The method of claim 1, further comprising producing an air flow, with a main air compressor, to the hydrogen fuel cell at an air flow rate of a percentage of the peak power rating of the aircraft.

3. The method of claim 2, wherein a continuous power for the aircraft is configured to be about fifty-five percent of the peak power rating of the aircraft.

4. The method of claim 1, further comprising storing the on-board oxygen supply in an oxygen tank sized to supply oxygen to the oxygen-air mixing and pressure regulating system and to the hydrogen fuel cell to boost power on demand from the powertrain control system.

5. The method of claim 1, further comprising capturing, with an oxygen recirculation system, exhaust air from an output of the hydrogen fuel cell and recirculating the exhaust air back into an input of the air compression system with the oxygen recirculation system.

6. A method of boosting power in an aircraft fuel cell system on demand, the method comprising:
   introducing an auxiliary on-board oxygen supply into an air compression system utilizing an oxygen-air mixing and pressure regulating system, the oxygen-air mixing and pressure regulating system configured to supply oxygen to a hydrogen fuel cell operably coupled to a hydrogen source, the air compression system, and a motor;
   supplying a main air compressor with the air compression system configured to produce an air flow to the hydrogen fuel cell at an air flow rate based on a percentage of a peak power rating of the aircraft; and
   operably coupling a compressed air source to the hydrogen fuel cell to initiate hydrogen fuel cell startup, the compressed air source supplying compressed air at a continuous flow rate until a voltage of the hydrogen fuel cell is high enough to power the main air compressor of the air compression system.

7. The method of claim 6, wherein a continuous power for the aircraft is configured to be about fifty-five percent of the peak power rating of the aircraft.

8. The method of claim 6, further comprising coupling the oxygen-air mixing and pressure regulating system with a powertrain control system to provide additional oxygen to boost power to the motor on demand from the powertrain control system during aircraft takeoff and initial climb.

9. A method of boosting power in an aircraft fuel cell system on demand, the method comprising:
   introducing an auxiliary on-board oxygen supply into an air compression system utilizing an oxygen-air mixing and pressure regulating system, the oxygen-air mixing and pressure regulating system configured to supply oxygen to a hydrogen fuel cell operably coupled to a hydrogen source, the air compression system, and a motor;
   coupling the oxygen-air mixing and pressure regulating system with a powertrain control system to provide additional oxygen from the on-board oxygen supply to boost power to the motor on demand from the powertrain control system during aircraft takeoff and initial climb; and
   operably coupling a compressed air source to the hydrogen fuel cell to initiate hydrogen fuel cell startup.

10. The method of claim 9, further comprising storing the auxiliary on-board oxygen supply in an oxygen tank.

11. The method of claim 9, further comprising producing an air flow, with a main air compressor, to the hydrogen fuel cell at an air flow rate of a percentage of a peak power rating of the aircraft.

12. The method of claim 9, further comprising capturing, with an oxygen recirculation system, exhaust air from an output of the hydrogen fuel cell and recirculating the exhaust air back into an input of the air compression system with the oxygen recirculation system.

13. The method of claim 9, further comprising supplying compressed air at a continuous flow rate until a voltage of the hydrogen fuel cell is high enough to power a main air compressor of the air compression system.

14. The method of claim 9, wherein a continuous power for the aircraft is configured to be about fifty-five percent of the peak power rating of the aircraft.

* * * * *